(12) United States Patent
Nakamoto et al.

(10) Patent No.: US 12,018,455 B2
(45) Date of Patent: Jun. 25, 2024

(54) SYSTEM AND METHOD IMPLEMENTING AUXILIARY DEVICE TO WORK MACHINE

(71) Applicant: Caterpillar SARL, Geneva (CH)

(72) Inventors: Yozo Nakamoto, Akashi (JP); Naoyuki Moriya, Akashi (JP); Kensuke Tanaka, Akashi (JP); Marilyn E. Worley, East Peoria, IL (US)

(73) Assignee: Caterpillar SARL, Geneva (CH)

( * ) Notice: Subject to any disclaimer, the term of this patent is extended or adjusted under 35 U.S.C. 154(b) by 366 days.

(21) Appl. No.: 17/467,466

(22) Filed: Sep. 7, 2021

(65) Prior Publication Data

US 2023/0076084 A1    Mar. 9, 2023

(51) Int. Cl.
| | | |
|---|---|---|
| *E02F 9/20* | (2006.01) | |
| *E02F 9/26* | (2006.01) | |
| *G05B 19/409* | (2006.01) | |
| *G06F 3/0338* | (2013.01) | |
| *G06F 3/04847* | (2022.01) | |
| *G06F 3/0482* | (2013.01) | |

(52) U.S. Cl.
CPC .............. *E02F 9/2012* (2013.01); *E02F 9/26* (2013.01); *G05B 19/409* (2013.01); *G06F 3/0338* (2013.01); *G06F 3/04847* (2013.01); *G05B 2219/39439* (2013.01); *G06F 3/0482* (2013.01)

(58) Field of Classification Search
CPC ......... E02F 9/2012; E02F 9/26; E02F 9/2004; G05B 19/409; G05B 2219/39439; G06F 3/0338; G06F 3/04847; G06F 3/0482; G05G 2009/04774
See application file for complete search history.

(56) References Cited

U.S. PATENT DOCUMENTS

2016/0046468 A1\*   2/2016   Heravi .................... B66D 1/54
                                                                 715/835
2019/0390441 A1    12/2019   Storey

FOREIGN PATENT DOCUMENTS

| EP | 1586712 A2 | 10/2005 |
|---|---|---|
| JP | 11-161357 A | 6/1999 |
| JP | 2000-309947 A | 11/2000 |
| JP | 2003-82709 A | 3/2003 |
| JP | 2005-146741 A | 6/2005 |
| JP | 3664665 B2 | 6/2005 |
| JP | 2005-307605 A | 11/2005 |
| JP | 2017-79039 A | 4/2017 |

\* cited by examiner

*Primary Examiner* — Tyler J Lee
*Assistant Examiner* — Yufeng Zhang (57) ABSTRACT

An assembly for a work machine comprises an operation lever comprising a first switch and a second switch, the first switch being activated and set for controlling the work machine and the second switch being deactivated at a point of factory shipment, a first port electrically coupled to the second switch of the operation lever, a second port coupled to a power source of the work machine, and a processing circuitry. The processing circuitry is configured to receive a request for setting an auxiliary device to the work machine from an input device, the auxiliary device being detachably attached to the work machine after the point of factory shipment; assign the first port to the second switch of the operation lever, to control the auxiliary device; assign the second port to the auxiliary device, to supply power to the auxiliary device; and set configuration information of the auxiliary device based on input information from the input device.

20 Claims, 10 Drawing Sheets

SYSTEM AND METHOD IMPLEMENTING AUXILIARY DEVICE TO WORK MACHINE

TECHNICAL FIELD

The present disclosure relates to work machines, and more particularly to construction machines having joysticks for control, and systems, assemblies, and methods thereof.

BACKGROUND

Certain types of construction machines include operation levers (e.g., joysticks) with a plurality of switches on them to control the machines. However, with conventional operation levers installed in construction machines, it may be difficult to provide new switches on the operational levers by a customer of the construction machine, for additional functions provided by additional auxiliary devices, unless the additional auxiliary devices are optional parts provided by the manufacturer of the construction machines and the additional functions are pre-installed at the time of manufacturing the construction machine.

Japanese Published Patent Document JPH11161357A ("the JP '357 Publication") describes easy mechanism of attachment to and detachment from an operation lever by equipping a switch mounting device with a holding means to hold a switch for opening and closing an electric circuit and with a fixing means to fix the holding means to the operation lever. According to the JP '357 Publication, a new switch can be additionally mounted on an outer peripheral portion of the operation lever.

However, it has been desired to be able to operate the additional auxiliary devices at hand, without re-holding the operation lever or changing sight line of an operator of the machine, for instance, to increase work efficiency.

SUMMARY

According to an aspect an assembly for a work machine is described or provided. The assembly for a work machine comprises an operation lever comprising a first switch and a second switch, the first switch being activated and set for controlling the work machine and the second switch being deactivated at a point of factory shipment, a first port electrically coupled to the second switch of the operation lever, a second port coupled to a power source of the work machine, and a processing circuitry. The processing circuitry is configured to receive a request for setting an auxiliary device to the work machine from an input device, the auxiliary device being detachably attached to the work machine after the point of factory shipment; assign the first port to the second switch of the operation lever, to control the auxiliary device; assign the second port to the auxiliary device, to supply power to the auxiliary device; and set configuration information of the auxiliary device based on input information from the input device.

In another aspect, a method for a work machine is disclosed or implemented. The method can comprise receiving a request for setting an auxiliary device to the work machine from an input device, the auxiliary device being detachably attached to the work machine after a point of factory shipment; assigning a first port to a second switch of an operation lever, to control the auxiliary device, the operation lever comprising a first switch and the second switch, the first switch being activated and set for controlling the work machine and the second switch being deactivated at the point of factory shipment, the first port being electrically coupled to the second switch of the operation lever; assigning a second port to the auxiliary device, to supply power to the auxiliary device, the second port coupled to a power source of the work machine; and setting configuration information of the auxiliary device based on input information from the input device.

And in another aspect a work machine is disclosed or provided. The work machine can comprise a body of the work machine; a joystick device comprising a first switch and a second switch, the first switch being activated and set for controlling the work machine and the second switch being deactivated at a point of factory shipment; a display device for displaying control information of the work machine to an operator; a control panel comprising a first port and a second port, the first port being electrically coupled to the second switch of the joystick device, and the second port being coupled to a power source mounted on the body of the work machine; and a processing circuitry. The processing circuitry is configured to receive a request for setting an auxiliary device to the work machine from an input device, the auxiliary device being detachably attached to the work machine after the point of factory shipment; assign the first port to the second switch of the joystick device, to control the auxiliary device; assign the second port to the auxiliary device, to supply power to the auxiliary device; and set configuration information of the auxiliary device based on input information from the input device.

Other features and aspects of this disclosure will be apparent from the following description and the accompanying drawings.

DETAILED DESCRIPTION

The present disclosure relates to work machines, and more particularly to construction machines having joysticks for control, and systems, assemblies, and methods thereof.

Generally, embodiments of the disclosed subject matter can implement an auxiliary relay for select add-on devices, wherein power to the add-on devices, which can pass through the auxiliary relay, can be controlled individually by an operator interface (e.g., one or more buttons) on the joystick.

Figure 1:
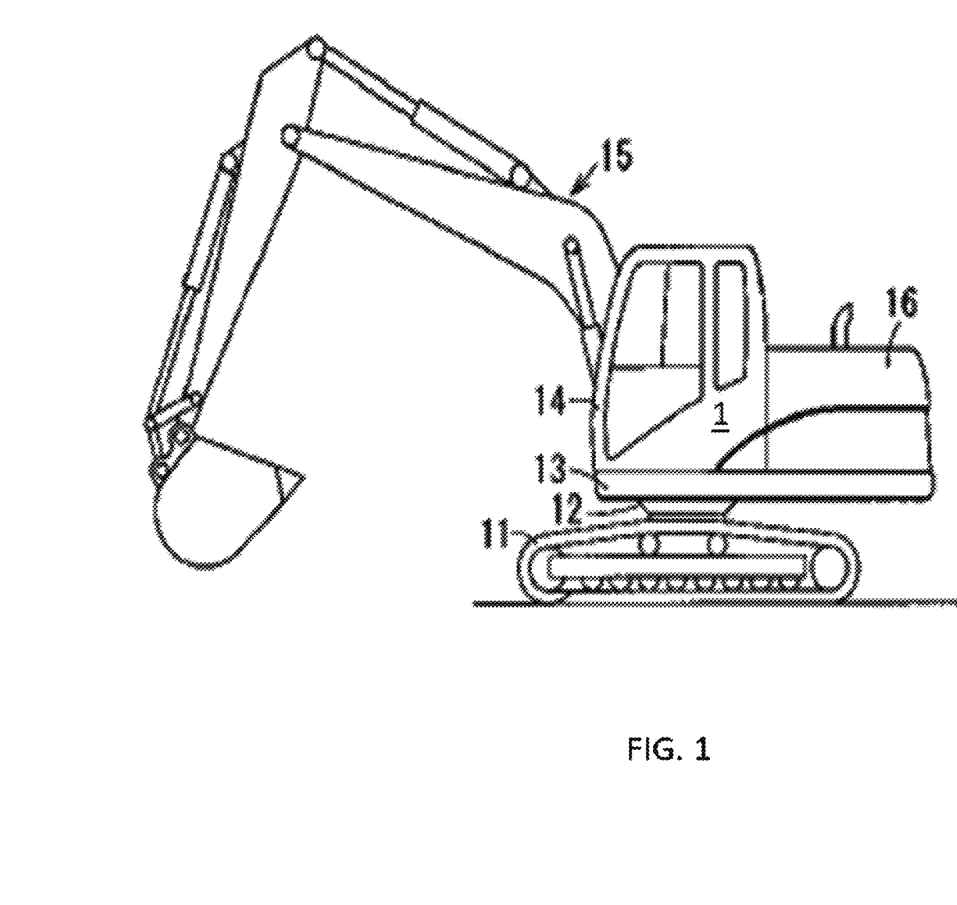
FIG. 1 is a side view of an excavator as example of a work machine according to one or more embodiments of the disclosed subject matter.

Turning to the figures, FIG. 1 shows a hydraulic excavator as a work machine 1, according to one or more embodiments of the disclosed subject matter, though embodiments of the disclosed subject matter are not so limited. Regarding the work machine 1, an upper swing body 13 can be rotatably provided as a machine body on a lower traveling body 11, via a swing bearing portion 12. A cab 14 can be mounted on one side of a front part of the upper swing body 13, and a driver's seat, an operation lever, and the like can be installed in the cab 14. Furthermore, a boom 15 for excavation work can be mounted on the other side of the front part of the upper swing body 13. An engine and a power device such as a hydraulic pump which is driven by the engine can be mounted on the rear part of the upper swing body 13 and covered with a power device cover 16.

Figure 2:
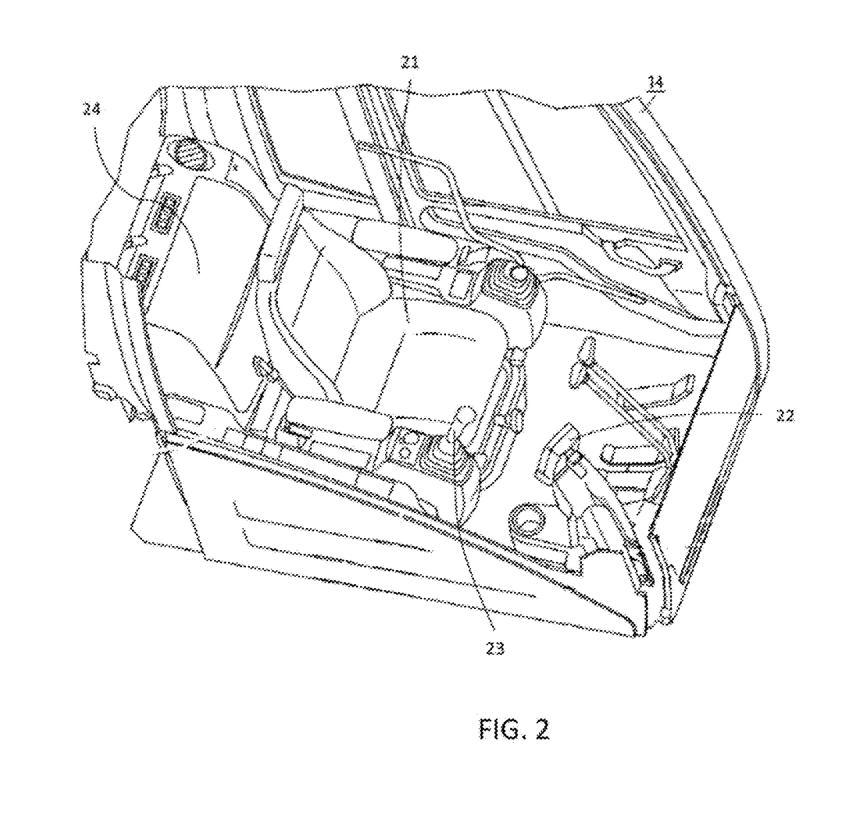
FIG. 2 is a perspective view of a cab of the work machine of FIG. 1.

FIG. 2 shows an example of inside of the cab 14 of the work machine 1 shown in FIG. 1. The cab 14 can include an operator's seat 21, a monitor 22, and an operation lever 23. The operator of the work machine 1 can receive various information shown on the monitor 22 and appropriately control the work machine 1 by the operation lever 23.

A rear cover plate 24 can be attached in a rear part of the cab 14 behind the operator's seat 21. In the embodiments, a rear panel 40 which includes relay devices and connection cables according to one or more embodiments of the disclosed subject matter can be arranged inside the rear cover plate 24. The detail of the rear panel 40 will be described with reference to FIGS. 4-5.

Figure 3:
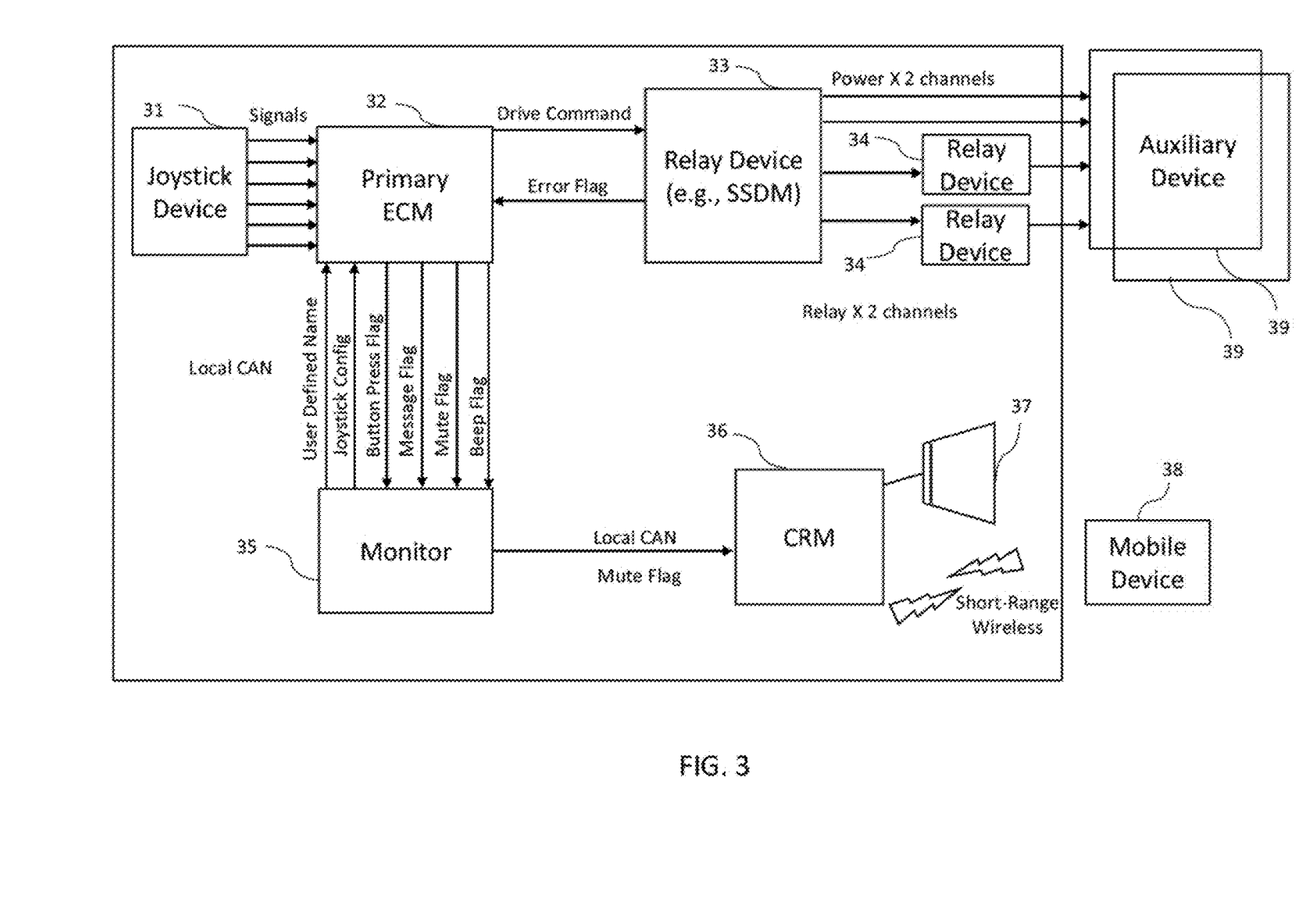
FIG. 3 is a schematic illustration of a system according to one or more embodiments of the disclosed subject matter implementable on work machines according to embodiments of the disclosed subject matter.

Turning now to FIG. 3, FIG. 3 is a schematic illustration of a system according to one or more embodiments of the disclosed subject matter implementable on work machines according to embodiments of the disclosed subject matter. Notably, FIG. 3 shows, diagrammatically, the prospect of providing add-on devices (e.g., auxiliary devices), which may have been added on ater fully manufactured by the manufacturer, that can have power individually provided to them via an added auxiliary relay, under control of a joystick device. The system may be provided, for instance, mounted, on a panel of the cab 14, for instance, on a back panel thereof. Non-limiting example of the auxiliary devices include a microphone, a light (e.g., beacon light), CB radio, water sprayer, etc. According to one or more embodiments, the system can have no more than four channels, thus, the system may be provided with no more than four add-one devices.

To solve the problems described above and other problems, systems according to embodiments of the present disclosure can provide a plurality of spare switches on the operation lever to operate additional auxiliary devices not installed at the timing of manufacturing the work machine 1. As one embodiment, for example, the work machine 1 can include a joystick device 31 as the operation lever, a primary ECM (Electric Control Module) 32, a relay device (e.g., SSDM: Solid State Driver Module) 33, one or more relay devices 34, a monitor 35, a CRM (CAN (Controller Area Network) Radio Module) 36, and a speaker 37. The work machine 1 can communicably connect to an auxiliary device 39 (or multiple auxiliary devices). The work machine 1 also can communicably connect to a mobile device 38, such as a smartphone, via wireless communication, for instance, short-range communication (e.g., LAN, Bluetooth, etc.).

In this embodiment, the operator of the work machine 1 can attach the auxiliary device 39 to the work machine 1 after purchase. For example, the operator may want to attach a customer device such as a beacon light, a CB (Citizens Band) radio, and a water sprayer, etc., as one or more auxiliary devices 39. For controlling the auxiliary device 39 without attaching an additional structure on the joystick device 31, the work machine 1 can provides the relay device 33 and one or more of the relay devices 34 equipped with connecting cables, at a time of factory shipment.

As shown in FIG. 3, for instance, two sets of the relay device 34 and corresponding connection cables (represented by the arrows) can be provided to support two auxiliary devices 39 each controlled by a specific switch on each of the joystick device 31. As noted above, each of the auxiliary devices 39 can be added to the work machine 1 after delivery from the manufacturer.

The power source can be supplied by the relay device 33 to the auxiliary device 39 via a power channel, and electric signal can be transmitted between the relay device 33 and the auxiliary device 39 via a relay channel and the relay device 34. Once the auxiliary device 39 is attached to a service power port and a service switch port on a panel in the cab 14 of the work machine 1, respectively, and the connection between the relay device 33 and the auxiliary device 39 is setup, for instance by the operator, the primary ECM 32 can assign the service power port and the service switch port corresponding to the auxiliary device 39 to one of the specific switches of the joystick device 31. Such specific switches may be referred to as spare switches and may not be associated with auxiliary devices or other devices at the time of manufacture of the work machine 1. Rather, as discussed, such spare switches may be individually assigned (or reassigned) to respective auxiliary devices 39 that may be added to the work machine 1 after the work machine 1 has been manufactured and delivered to an initial customer, for instance.

The primary ECM 32 can be electrically connected to the monitor 35 via a local CAN. The primary ECM 32 can set identification information of the auxiliary device 39, for instance, based on input of "a user defined name" transmitted from the monitor 35. Similarly, the primary ECM 32 can set configuration information of the auxiliary device 39 based on input of "joystick configuration" transmitted from the monitor 35.

Furthermore, the primary ECM 32 can control the monitor 35 to display selectable information on the monitor 35, in order to receive further configuration information from input by the joystick device 31 and/or by the monitor 35. For example, the primary ECM 32 can control the monitor 35 to display selectable fields of "button press flag," "message flag," "mute flag," "beep flag," etc. More specifically, as one example, when the operator selects "Enabled" for "message flag" using the joystick device 31, the primary ECM 32 can set the function accordingly.

Then, the primary ECM 32 can transmit a drive command to the relay device 33 to control the corresponding auxiliary device 39, in response to signals transmitted from the joystick device 31 to the primary ECM 32. The primary ECM 32 may receive an "error flag" from the relay device 33 in case that a failure is occurred at some point between the relay device 33 and one or more of the auxiliary devices 39.

The CRM 36 can be electrically connected to the speaker 37 and to the monitor 35 via a local CAN. When the primary ECM 32 transmits "mute flag" to the CRM 36 via the monitor 35 and the local CAN, the CRM 36 can control the speaker 37 to mute the sound. The CRM 36 can also communicate with the mobile device 38 wirelessly (e.g., via Bluetooth communication) and control the mobile device 38 to mute the sound of a microphone of the mobile device 38.

It is noted that embodiments of the disclosed subject matter are not limited to the specific number of sets of the relay device 34 and the connection cables as shown in FIG. 3. For instance, embodiments of the disclosed subject matter can include more switches on the joystick device 31 and sets of the relay devices 34 and the connection cables to control additional auxiliary devices 39.

Figure 4:
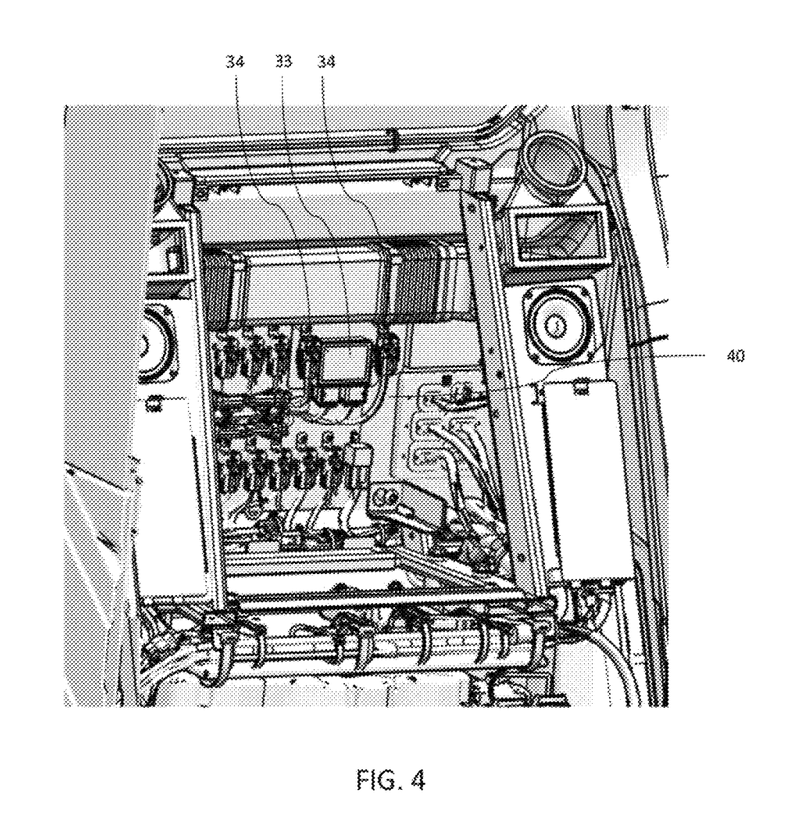
FIG. 4 shows a perspective view of a rear part of a cab according to embodiments of the disclosed subject matter.
Figure 5:
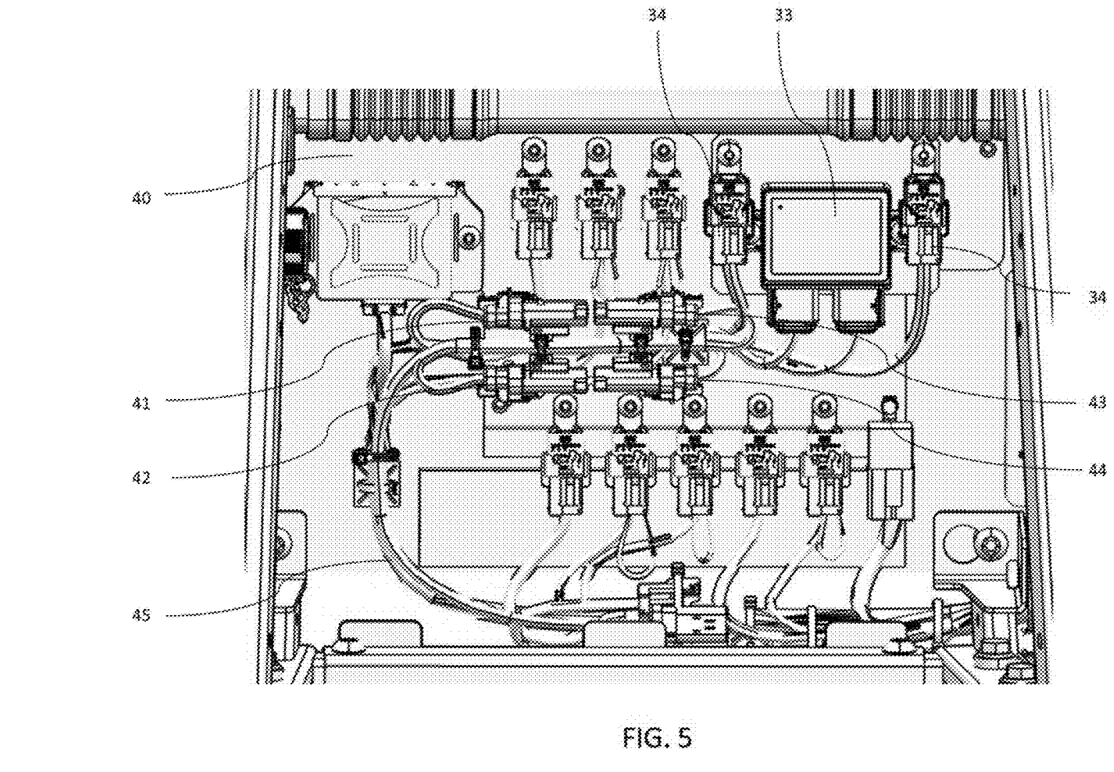
FIG. 5 shows a front view of a rear panel in the rear part of FIG. 4 according to embodiments of the disclosed subject matter.

Referring now to FIGS. 4-5, the relay devices 34 and the connection cables can be disposed on a rear panel 40 inside the rear cover plate 24 of the cab 14. This may allow relatively easy access to configure the system for one or more auxiliary devices 39.

FIG. 4 shows a perspective view of a rear part of the cab 14 according to embodiments of the disclosed subject matter. In FIG. 4, the rear cover plate 24 is removed for explanation of the inside.

As shown in FIG. 4, the rear panel 40 can be attached on the rear part of the cab 14. The relay device 33 and the relay devices 34 can be disposed on the real panel in conjunction with other components. The arrangement of the relay device 33 and the relay devices 34 and other components will be described with reference to FIG. 5.

FIG. 5 is a front view of the rear panel 40 in the rear part of FIG. 4, which shows an example of arrangement of relay modules and connection cables on the rear panel 40 of the cab 14. As shown in FIG. 5, the relay device 33 and the relay devices 34 can be disposed on the rear panel 40. As an example, according to one or more embodiments, there may be four ports disposed on the rear panel 40. A first port 41 and a second port 42 can be switch ports and can be connected to each one of the relay devices 34 by a connection cable, respectively. A third port 43 and a fourth port 44 can be power source ports and can be connected to the relay device 33 by power cables, respectively. A harness cable 45 can be connected to the four ports at one end and connected to another cable at the other end, for instance, which can connect electrical wiring from the rear panel 40 inside of the cab 14 to an outer surface of the cab 14.

It is noted that embodiments of the disclosed subject matter are not limited to the specific arrangement of the relay modules and ports as shown in FIG. 5. For instance, embodiments of the disclosed subject matter can include more switches on the joystick device 31 and sets of the relay devices 34 and the connection cables for controlling more auxiliary devices 39 on the rear panel 40.

Figure 6:
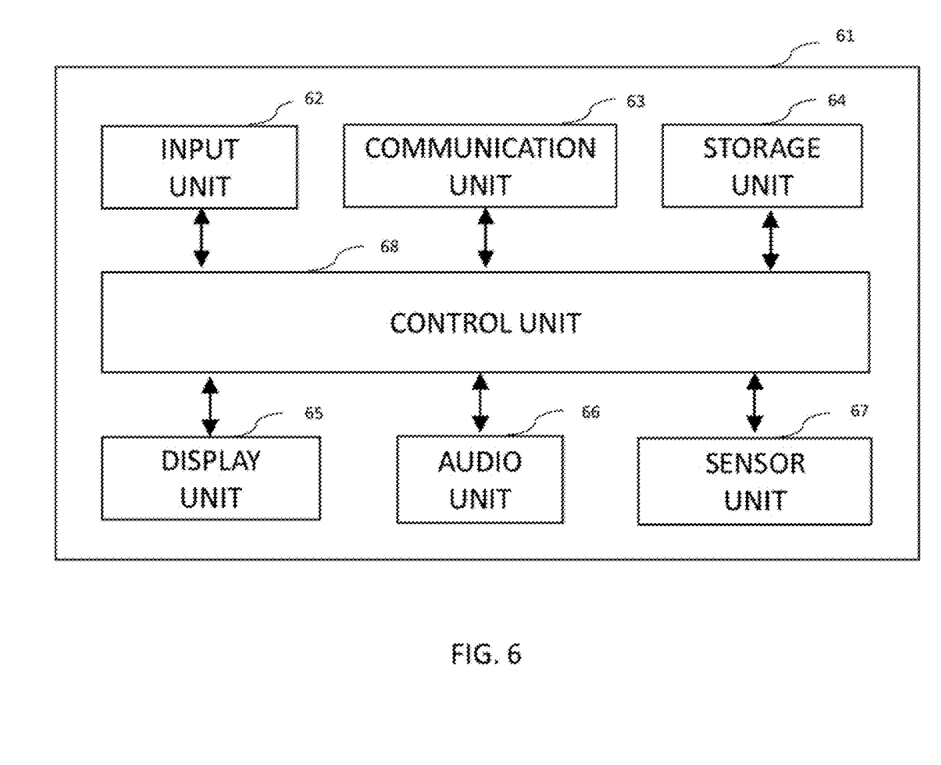
FIG. 6 is a block diagram illustrating a configuration of an information processing system according to embodiments of the disclosed subject matter.

FIG. 6 shows a block diagram illustrating a configuration of an information processing system 61 of the work machine 1 according to one or more embodiments of the disclosed subject matter. As illustrated in FIG. 6, the information processing system 61 can include an input unit 62, a communication unit 63, a storage unit 64, a display unit 65, an audio unit 66, a sensor unit 67, and a control unit 68.

The input unit 62 can have a function of receiving an input of operation information from a user of the information processing system 61. In this embodiment, the input unit 62 can be implemented as switches of the joystick device 31 shown in FIG. 3 and a touch panel of the monitor 35 shown in FIG. 3, or a keyboard.

The communication unit 63 can have a communication interface that has a function as a transmitter and a receiver performing communication with an external apparatus, on the basis of the control from the control unit 68. In this embodiment, the communication unit 63 can be configured using a communication device such as a local CAN shown in FIG. 3, a wired or wireless LAN, a communication card for Bluetooth, a router for communication, and a modem for communication.

The storage unit 64 can have a function of storing a variety of information used by the control unit 68. For example, the storage unit 64 can store selection information and configuration information of the auxiliary device acquired by the input unit 62. The storage unit 64 can be configured using a storage device such as a magnetic storage device, a semiconductor storage device, and an optical storage device.

The display unit 65 can have a function of displaying a variety of information, on the basis of control from the control unit 68. For example, the display unit 65 can display selection information and configuration information of the auxiliary device acquired by the input unit 62. The display unit 65 can be configured using a display device such as a liquid crystal display, a plasma display, and an organic EL display. The display unit 65 can be implemented as the monitor 35 shown in FIG. 3 and can be equipped with a touch panel to input information to the control unit 68.

The audio unit 66 can have a function of outputting sound on the basis of control from the control unit 68. In this embodiment, the audio unit 66 can be implemented as a horn or the speaker 37 of the work machine 1 as shown in FIG. 3.

The sensor unit 67 can detect various information of the work machine 1. For example, a triaxial acceleration sensor (including an acceleration sensor, a gravity detection sensor, and a fall detection sensor) or a triaxial gyro sensor (including an angular velocity sensor, and a geomagnetic sensor) can be used as the sensor unit 67.

The control unit 68 can have a function of controlling an entire operation of the information processing system 61 (i.e., the work machine 1). For example, the control unit 68 can control the operation of the work machine 1, on the basis of the operation information output from the input unit 62. The control unit 68 can include a CPU, a ROM, and a RAM. In this embodiment, the control unit 68 can be implemented as the primary ECM 32 or a combination of the primary ECM 32 and other modules of the work machine 1 as shown in FIG. 3.

In an exemplary implementation, information processing system 61 of the work machine 1, or portions thereof, can be implemented using circuitry or processing circuitry that can include general purpose processors, special purpose processors, integrated circuits, ASICs ("Application Specific Integrated Circuits"), CPU (a Central Processing Unit), a micro processing unit (MPU), conventional circuitry and/or combinations thereof which are configured or programmed to perform the disclosed functionality. Processors can be considered processing circuitry or circuitry as they include transistors and other circuitry therein. The processor may be a programmed processor which executes a program stored in a memory. In the disclosure, the circuitry, units, or means can be hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units can be a combination of hardware and software, the software being used to configure the hardware and/or processor.

Figure 7:
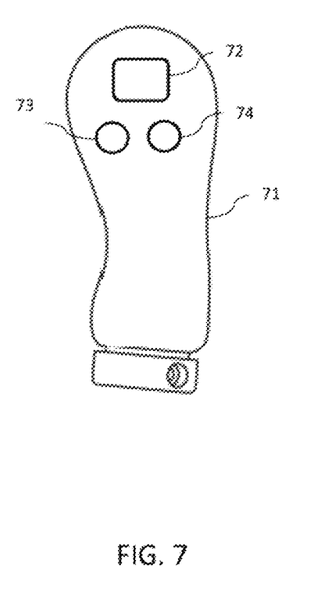
FIG. 7 is a front view of a joystick according to embodiments of the disclosed subject matter.

FIG. 7 shows a front view of a joystick, exemplary described as the operation lever 23 in FIG. 2, and the joystick device 31 as shown in FIG. 3.

The operator can hold a control lever 71 so that the thumb of the right hand (or left hand) is positioned on the front side of the tip of the control lever 71 and the other fingers of the hand are positioned on the back side of the central portion of the control lever 71. The detail functions are described hereafter as a left joystick for the left hand. A slide switch 72, a first switch 73, and a second switch 74 can be arranged on the front side of the control lever 71.

The slide switch 72, the first switch 73, and the second switch 74 can be disposed in a predetermined range of the front of the control lever 71 so that the switches can be pressed by a thumb of the operator's hand with holding the control lever 71. In other words, the control lever 71 may be held while simultaneously operating the switches without releasing the control lever 71.

The operator can operate the slide switch 72 by sliding it in the horizontal direction, for instance, of the slide switch 72 with the thumb of the hand holding the control lever 71, to operate a work tool attached to the edge of the boom 15 shown in FIG. 1 (e.g., tilting a tilt bucket). Also, the slide switch 72 can be used for setting configuration, such as change a target height of a system, depending upon the type and configuration of the work machine 1.

The operator can operate the first switch 73 by pressing it with the thumb. In this embodiment, the first switch 73 can be for control a horn speaker (e.g., warning sound) of the work machine 1 as a pre-installed device at the timing of manufacturing, but not limited thereto.

The operator can operate the second switch 74 by pressing it with the thumb. In this embodiment, the second switch 74 can be for control the auxiliary device described as the auxiliary device 39 shown in FIG. 3 above, which has not been installed at the timing of manufacturing the work machine 1. Here, though only one second switch 74 is shown, embodiments of the disclosed subject matter are not so limited and may include multiple switches for multiple auxiliary devices 39 installed after the timing of manufacturing the work machine 1. Thus, it is noted that embodiments of the disclosed subject matter are not limited to the specific arrangement of the switches on the joystick as shown in FIG. 7. For instance, embodiments of the disclosed subject matter can arrange the switches in different positions (e.g., positioning the slide switch in the vertical direction), or include more switches on the joystick for other functions of the work machine 1.

Figure 8:
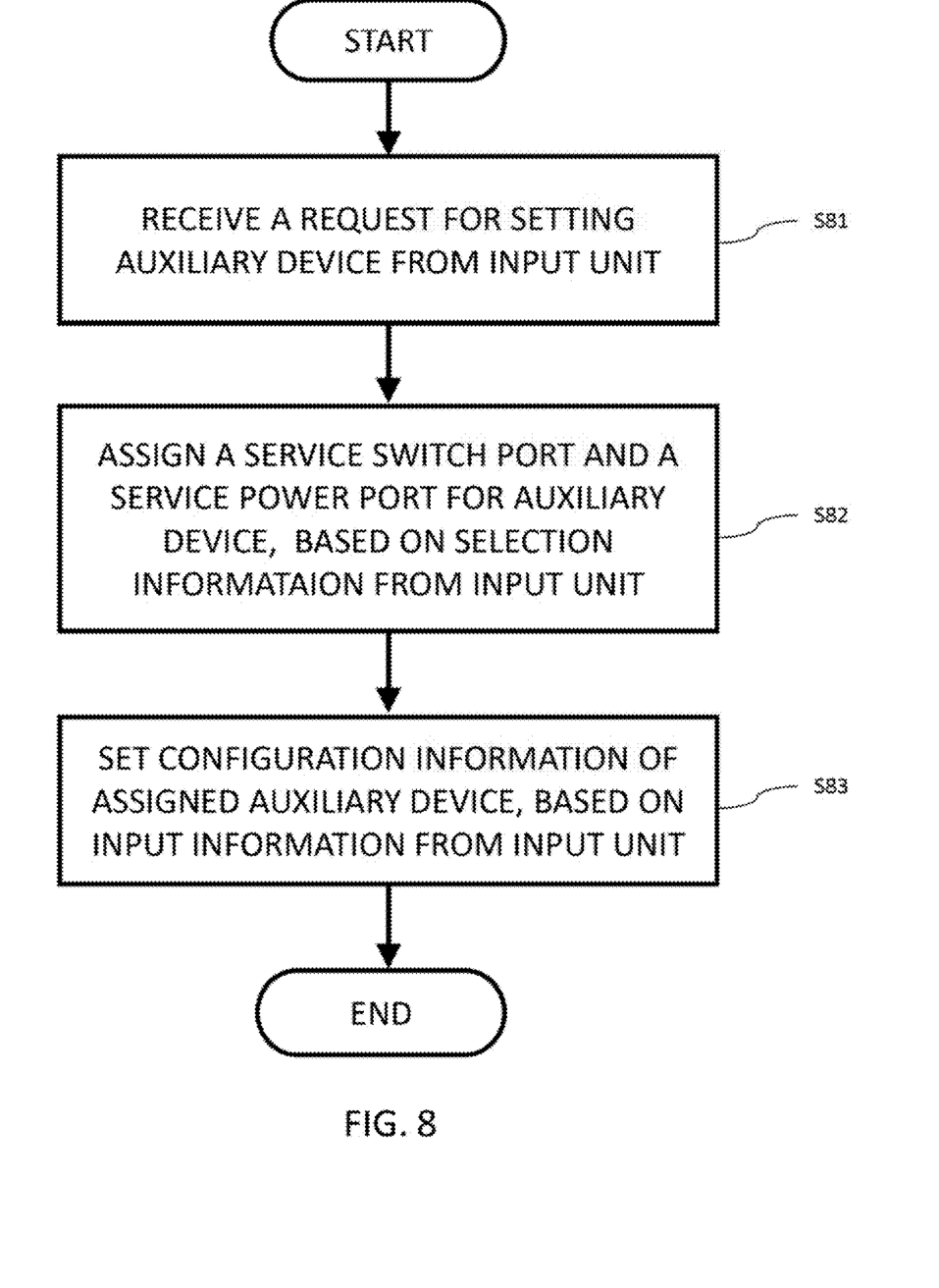
FIG. 8 is a flowchart of setting an auxiliary device to a joystick according to embodiments of the disclosed subject matter.

FIG. 8 is a flowchart of setting an auxiliary device to a joystick according to one or more embodiments of the disclosed subject matter. The control unit 68 can receive a request to set the auxiliary device (or devices), which can be transmitted from the input unit 62 (S81). In step S81, for example, the control unit 68 may receive the request to set the auxiliary device(s) from the joystick device 31 as shown in FIG. 3 or from the touch panel of the monitor 35 as shown in FIG. 3, as the input unit 62.

Next, in step S82, the control unit 68 can assign a service switch port and a service power port corresponding to the auxiliary device 39 to one of the switches of the joystick device 31, based on selection information from the input unit 62. In step S82, for example, the control unit 68 may assign the first port 41 as the service switch port and the third port 43 as the service power port as shown in FIG. 4 to the second switch 74 of the joystick as shown in FIG. 7, for instance, in order to control a CB radio as the auxiliary device 39.

Next, in step S83, the control unit 68 can set configuration information of the assigned auxiliary device 39, based on input information from the input unit 62. In step S83, for example, the control unit 68 may set, "user defined name," "output start up setting," "switch mode," "status mode," "status sound type," and/or "mute Bluetooth and speakers," as the configuration information of the assigned auxiliary device 39. More specifically, for instance, the control unit 68 may set "momentary" for the "switch mode" for the second switch 74 that corresponds to the first port 41, as the configuration information of the assigned auxiliary device 39, based on input information from the input unit 62. In this embodiment, the operator can select "switch mode" from "momentary" or "toggle" by the input unit 62. The switch mode of "momentary" can be for energizing the auxiliary device only while the switch is pressed, and the switch mode of "toggle" can be for energizing the auxiliary device by shifting ON/OFF when the switch is pressed.

After setting the configuration information of the auxiliary device 39 to the switch of the joystick in step S83, the process may be terminated.

In other instances, in steps S81 to S83, the control unit 68 may perform receiving process, assigning process, and setting process, based on a command from an external device (e.g., a mobile information processing device, a smartphone, a server at a control center) via a network, instead of input by the input unit 62. As a result, the operator can setup the installation of the auxiliary device by remote control, without riding on the cab 14 and operating the joystick device 31.

Figure 9:
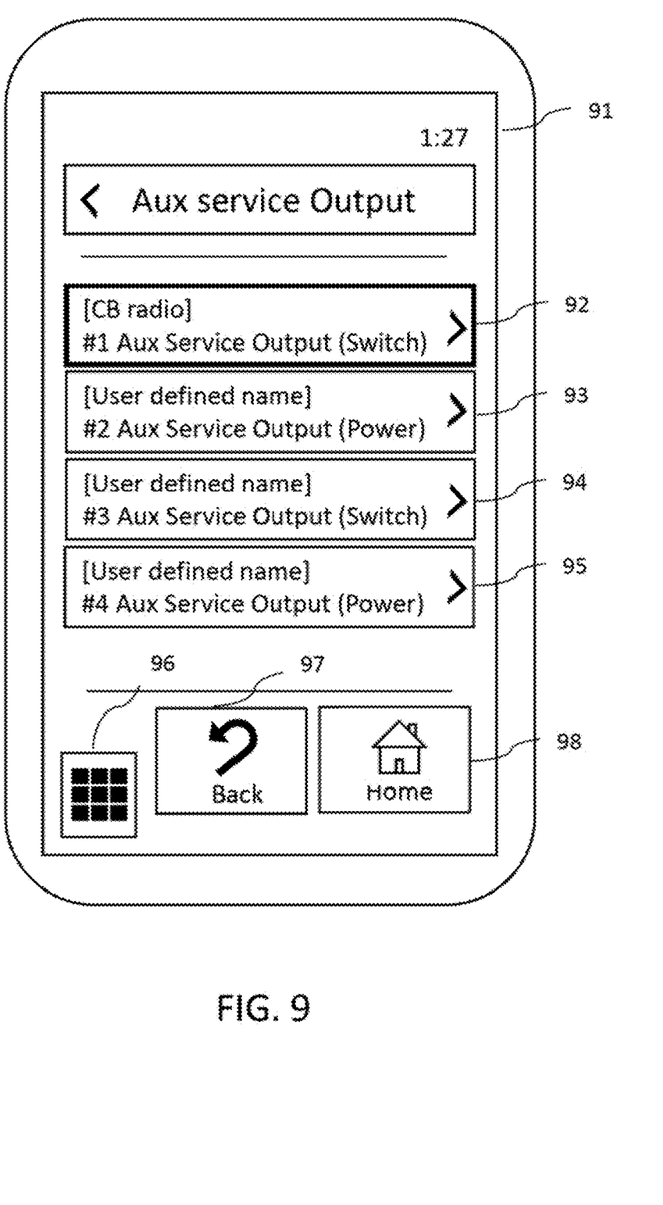
FIG. 9 is a schematic illustration of a monitor when setting an auxiliary device to a joystick according to embodiments of the disclosed subject matter.

FIG. 9 shows a schematic illustration of the monitor 35 or the display unit 65 when setting the auxiliary device to the joystick device 31. The monitor 35 can display a screen 91 for setting auxiliary device to the joystick. Here, in FIG. 9, a field 92 is currently selected to input the "user defined name" corresponding to the first port 41, and the "user defined name" corresponding to the first port 41 (a service switch port) is registered as "CB radio" by the input unit 62.

Similarly, a field 93 is for setting "user defined name" corresponding to the third port 43 (a service power port), a field 94 is for setting "user defined name" corresponding to the second port 42 (a service power port), and a field 95 is for setting "user defined name" corresponding to the fourth port 44 (a service power port). The operator can select a field among the fields 93-95, each corresponding to any one of the service switch ports or the service power ports to assign.

Optionally, the screen 91 can include a menu button 96, a back button 97 and a home button 98. The menu button 96 is to show menu items, the back button 97 is to return to previous screen, and the home button 98 is to return to a home screen.

Optionally, as shown in FIG. 3, the monitor 35 and can be equipped with the touch panel to input information to the control unit 68, so the setting information, such as the "user defined name" corresponding to the fields 92-95, and the commands corresponding to the menu button 96, the back button 97, and the home button 98 can be input via the screen 91 by the touch panel of the monitor 35.

It is noted that embodiments of the disclosed subject matter are not limited to the specific arrangement of the fields and the buttons on the screen as shown in FIG. 9. For instance, embodiments of the disclosed subject matter can arrange the fields and the buttons in different positions or include more fields and buttons on the screen for other functions of the work machine 1.

Figure 10:
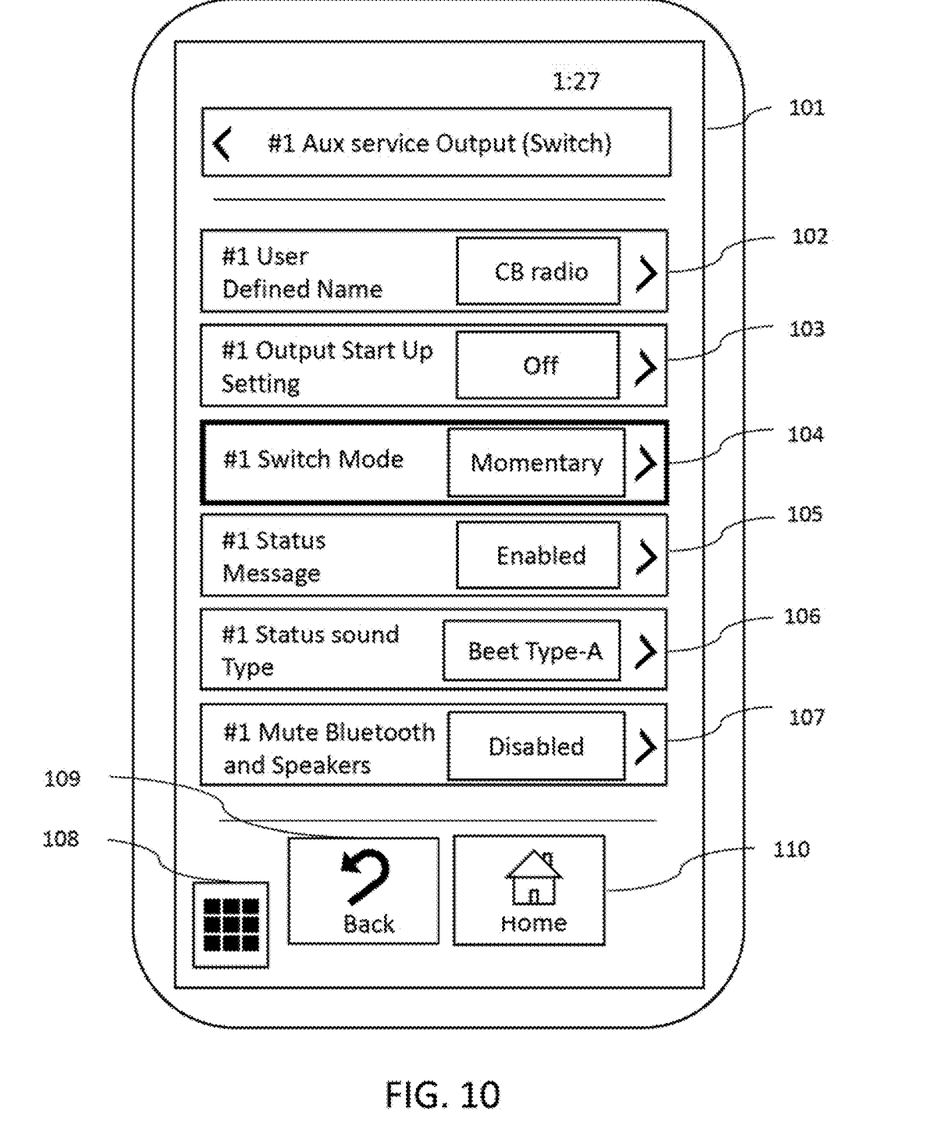
FIG. 10 is a schematic illustration of a monitor when setting configurations of an auxiliary device to a joystick according to embodiments of the disclosed subject matter.

FIG. 10 is a schematic illustration of the monitor 35 when setting configurations of an auxiliary device to a joystick. The monitor 35 displays a screen 101 for setting configuration information of the auxiliary device to the joystick. Here, in FIG. 10, fields 102-107 are displayed for setting configuration information of the auxiliary device.

A field 102 is for registering and editing the "user defined name" corresponding to the first port 41. In this embodiment, the field 102 shows "CB radio" as the "user defined name" of the auxiliary device.

A field 103 is for setting the "output start up setting" of the first port 41, whether to start set up of the port. The field 103 can be selected from ON or OFF. In this embodiment, the field 103 shows "off" as "output start up setting" of the first port 41.

A field 104 is for setting the "switch mode" of the first port 41. The field 104 can be selected from "momentary" or "toggle". The switch mode of "momentary" is for energizing the auxiliary device only while the switch is pressed, and the switch mode of "toggle" is for energizing the auxiliary device by shifting ON/OFF when the switch is pressed. In this embodiment, the field 104 is currently selected to input the "switch mode" of the first port 41, and the "switch mode" of the first port 41 (a service switch port) is registered as "momentary" by the input unit 62.

A field 105 is for setting the "status message" of the auxiliary device (here, CB radio in FIG. 10), whether to show the status message of the auxiliary device on the monitor. The field 105 can be selected from "Enabled" or "Disabled". In this embodiment, the field 105 shows "Enabled" as "status message" of the auxiliary device.

A field 106 is for setting the "status sound type" of the auxiliary device. The field 106 can be selected from at least one of pre-installed types of sound. In this embodiment, the field 106 shows "Beet Type-A" as "status sound type" of the auxiliary device.

A field 107 is for setting the "mute Bluetooth and speakers" of the auxiliary device. The field 107 can be selected from "Enabled" or "Disabled". In this embodiment, the field 107 shows "Disabled" as "mute Bluetooth and speakers" of the auxiliary device.

Optionally, the screen 101 can include a menu button 108, a back button 109 and a home button 110. The menu button 108 is to show menu items, the back button 109 is to return to previous screen, and the home button 110 is to return to a home screen.

Optionally, as shown in FIG. 3, the monitor 35 and can be equipped with the touch panel to input information to the control unit 68, so the setting information, such as "output start up setting" corresponding to the field 103, and any of other fields 102, 104-107, and the commands corresponding to the menu button 108, the back button 109, and the home button 110 can be input via the screen 101 by the touch panel of the monitor 35.

It is noted that embodiments of the disclosed subject matter are not limited to the specific arrangement of the fields and the buttons on the screen as shown in FIG. 10. For instance, embodiments of the disclosed subject matter can arrange the fields and the buttons in different positions or include more fields and buttons on the screen for other functions of the work machine 1.

INDUSTRIAL APPLICABILITY

As noted above, the present disclosure relates to work machines, and more particularly to construction machines having joysticks to control, and systems, assemblies, and methods thereof.

Embodiments of the disclosed subject matter can involve an assembly for a work machine comprising an operation lever comprising a first switch and a second switch. The first switch is activated and set for controlling the work machine and the second switch is deactivated at a point of factory shipment. The assembly can comprise a first port electrically coupled to the second switch of the operation lever, and a second port coupled to a power source of the work machine. Furthermore, the assembly can comprise a processing circuitry that is configured to receive a request for setting an auxiliary device to the work machine from an input device, the auxiliary device being detachably attached to the work machine after the point of factory shipment; assign the first port to the second switch of the operation lever, to control the auxiliary device; assign the second port to the auxiliary device, to supply power to the auxiliary device; and set configuration information of the auxiliary device based on input information from the input device. The operation lever can be a joystick device that moves forwards, backwards, and sideways by maneuvering with an operator's hand, to control the work machine. In this embodiment, the first switch and the second switch can be disposed in front of the operation lever so that the first switch and the second switch can be pressed by a thumb of the operator's hand with holding the operation lever. Moreover, the input device can be the joystick device. The assembly may comprise a display device to display a screen providing fields for setting the configuration information of the auxiliary device, and the processing circuitry can set the configuration information based on input to the fields of the screen displayed on the display device. Alternatively, the assembly can comprise two sets of an auxiliary device and two ports, each auxiliary device can be controlled by a switch on one joystick (e.g., left hand) and other switch on other joystick (e.g., right hand), respectively. The assembly can set various configuration information of the auxiliary device by input from an input device (e.g., joystick or a touch panel of a monitor). With these features, the operator of the work machine may only need to assign ports to the joystick and set configuration information to control the auxiliary device, without attaching extra components to equip with additional switches of the joystick peripherally and complicated installation. Thus, embodiments of the disclosed subject matter can increase work efficiency of the work machine by providing such joystick and components.

According to the embodiments, it is possible to operate an additional auxiliary device at hand, without re-holding an operation lever or changing sight line of an operator of the work machine. Therefore, it can increase work efficiency of the work machine.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An assembly for a work machine comprising:
   an operation lever comprising a first switch and a second switch, the first switch being activated and set for controlling the work machine and the second switch being deactivated at a point of factory shipment;
   a first port electrically coupled to the second switch of the operation lever;
   a second port coupled to a power source of the work machine; and
   a processing circuitry configured to receive a request for setting an auxiliary device to the work machine from an input device, the auxiliary device being detachably attached to the work machine, assign the first port to the second switch of the operation lever, to control the auxiliary device, assign the second port to the auxiliary device, to supply power to the auxiliary device, and set configuration information of the auxiliary device based on input information from the input device.

2. The assembly according to claim 1, wherein the operation lever is a joystick device that moves forwards, backwards, and sideways by maneuvering with an operator's hand, to control the work machine.

3. The assembly according to claim 2, wherein the first switch and the second switch are disposed in front of the operation lever so that the first switch and the second switch can be pressed by a thumb of the operator's hand with holding the operation lever.

4. The assembly according to claim 2, wherein the input device is the joystick device.

5. The assembly according to claim 1, further comprising:
a display device to display a screen providing fields for setting the configuration information of the auxiliary device,
wherein the processing circuitry is configured to set the configuration information based on input to the fields of the screen displayed on the display device.

6. The assembly according to claim 1, further comprising:
another operation lever comprising a third switch and a fourth switch, the third switch being activated and set for controlling the work machine and the fourth switch being deactivated at the point of factory shipment;
a third port electrically coupled to the fourth switch of the operation lever;
a fourth port coupled to the power source; and
the processing circuitry configured to
receive a request for setting another auxiliary device to the work machine from the input device, the other auxiliary device being detachably attached to the work machine,
assign the third port to the fourth switch of the other operation lever, to control the other auxiliary device,
assign the fourth port to the other auxiliary device, to supply power to the other auxiliary device, and
set configuration information of the other auxiliary device based on input information from the input device.

7. The assembly according to claim 1, wherein the processing circuitry is configured to set a switch mode of the second switch as the configuration information, the switch mode being selectable from a momentary mode and a toggle mode.

8. The assembly according to claim 5, wherein the processing circuitry is configured to set a status message of the second switch as the configuration information, the status message being enabled or disabled to show status message on the display device.

9. The assembly according to claim 1, wherein the auxiliary device is at least one of a beacon light, a CB (Citizens Band) radio, and a water sprayer.

10. A method for a work machine comprising:
receiving a request for setting an auxiliary device to the work machine from an input device, the auxiliary device being detachably attached to the work machine;
assigning a first port to a second switch of an operation lever, to control the auxiliary device, the operation lever comprising a first switch and the second switch, the first switch being activated and set for controlling the work machine and the second switch being deactivated at the point of factory shipment, the first port being electrically coupled to the second switch of the operation lever;
assigning a second port to the auxiliary device, to supply power to the auxiliary device, the second port coupled to a power source of the work machine; and
setting configuration information of the auxiliary device based on input information from the input device.

11. The method according to claim 10, wherein the operation lever is a joystick device that moves forwards, backwards, and sideways by maneuvering with an operator's hand, to control the work machine.

12. The method according to claim 11, wherein the first switch and the second switch are disposed in front of the operation lever so that the first switch and the second switch can be pressed by a thumb of the operator's hand with holding the operation lever.

13. The method according to claim 12, wherein the input device is the joystick device.

14. The method according to claim 10, wherein a switch mode of the second switch is set as the configuration information, the switch mode being selectable from a momentary mode and a toggle mode.

15. The method according to claim 10, wherein a status message of the second switch is set as the configuration information, the status message being enabled or disabled to show status message on a display device of the work machine.

16. A work machine comprising:
a body of the work machine;
a joystick device comprising a first switch and a second switch, the first switch being activated and set for controlling the work machine and the second switch being deactivated at a point of factory shipment;
a display device for displaying control information of the work machine to an operator;
a control panel comprising a first port and a second port, the first port being electrically coupled to the second switch of the joystick device, and the second port being coupled to a power source mounted on the body of the work machine; and
a processing circuitry configured to
receive a request for setting an auxiliary device to the work machine from an input device, the auxiliary device being detachably attached to the work machine,
assign the first port to the second switch of the joystick device, to control the auxiliary device,
assign the second port to the auxiliary device, to supply power to the auxiliary device, and
set configuration information of the auxiliary device based on input information from the input device.

17. The work machine according to claim 16, wherein the first switch and the second switch are disposed in front of the joystick device so that the first switch and the second switch can be pressed by a thumb of the operator's hand with holding the joystick device.

18. The work machine according to claim 16,
wherein the display device displays a screen providing fields for setting the configuration information of the auxiliary device, and
wherein the processing circuitry is configured to set the configuration information based on input to the fields of the screen displayed on the display device.

19. The work machine according to claim 16, wherein the processing circuitry is configured to set a switch mode of the second switch as the configuration information, the switch mode being selectable from a momentary mode and a toggle mode.

20. The work machine according to claim 16, wherein the processing circuitry is configured to set a status message of the second switch as the configuration information, the status message being enabled or disabled to show status message on the display device.

* * * * *